Figure 2:
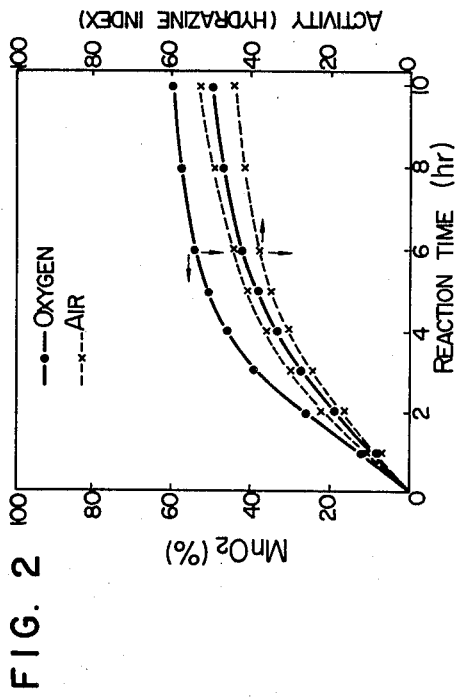

United States Patent [19]

Tanabe et al.

[11] 4,402,931
[45] Sep. 6, 1983

[54] PROCESS FOR PRODUCING MANGANESE DIOXIDE

[75] Inventors: Isao Tanabe, 150, Higashihagiocho, Ohmuta-shi; Ryoichi Nagata, Ohmuta; Toru Watanabe; Nobuaki Miyamoto, both of Arao, all of Japan

[73] Assignees: Isao Tanabe, Ohmuta; Mitsui Mining & Smelting Co., Ltd., Tokyo, both of Japan

[21] Appl. No.: 383,332

[22] Filed: May 28, 1982

Related U.S. Application Data

[63] Continuation of Ser. No. 192,545, Sep. 30, 1980, abandoned.

[30] Foreign Application Priority Data

Oct. 4, 1979 [JP] Japan .................. 54-128408

[51] Int. Cl.³ .................. C01G 45/00; C01G 45/02; C01B 31/24
[52] U.S. Cl. ................. 423/605; 423/419 R; 423/50
[58] Field of Search ............ 423/50, 419 R, 605

[56] References Cited

U.S. PATENT DOCUMENTS 2,608,463  8/1952  Dean .................................. 423/150
2,739,914  3/1956  Babbit et al. ..................... 423/50
3,011,867  12/1961 Welsh ................................ 423/419

FOREIGN PATENT DOCUMENTS 50-21995  4/1975  Japan .

Primary Examiner—O. R. Vertiz
Assistant Examiner—Steven Capella
Attorney, Agent, or Firm—Armstrong, Nikaido, Marmelstein & Kubovcik

[57] ABSTRACT

Manganese dioxide having high bulk density, high tap density and high activity for use in batteries can be obtained by decomposing an aqueous solution of ammonia complex of manganese at a temperature of 68° C. or higher than roasting the resulting manganese carbonate in an atmosphere of oxygen and 15-85% of steam at a temperature of 275° to 375° C.

6 Claims, 7 Drawing Figures

PHOTO 1
5μ
PHOTO 2
10μ
PHOTO 3
5μ
PHOTO 4
10μ

PROCESS FOR PRODUCING MANGANESE DIOXIDE

This is a continuation, of application Ser. No. 192,545, filed Sept. 30, 1980 now abandoned.

This invention relates to a fundamental advancement and development of the process of Japanese Patent Publication No. 21,995/1975 which was invented by one of the inventors as a non-electrolytic process for producing manganese dioxide and was patented previously.

Briefly saying, the intention of the abovementioned process consists in that a manganese salt such as manganese sulfate, as a starting material, is reacted with a soluble carbonate such as sodium carbonate to obtain starting manganese carbonate and then the latter is heated and decomposed and oxidized with an air containing 10–80% of steam at a temperature of 280° C.–400° C. to obtain crude $MnO_2$ which can be used directly in batteries or as products in batteries after enhancement of the quality and activity of $MnO_2$ by a treatment with sulfuric acid.

However, the oxidized product has a $MnO_2$ content of 80–85% and an activity of 55–57 as measured by Drotschman method. After the oxidized product has been enriched with sulfuric acid, the content is 90–92% and the activity is improved to 55–59. Though it is a considerably high quality, the bulk density is about 0.90 so that the product is lightweight and bulky, which is the greatest fault of this product. The inventors of the above-mentioned patent intended to enhance the bulk density by a press treatment for overcoming the faults, and devised an improvement of bulk density by means of a press and auxiliary treatments in Japanese Patent Publication No. 2,420/1972, No. 2,422/1972, No. 27,277/1974, etc. Actually, however, a drastic solution of the problem of bulk density encounters a difficulty so that it cannot reach the stage of practical application yet.

In Table 1, the typical analytical results of the enriched product published by the inventors of the above-mentioned patent are compared with those of electrolytic manganese dioxide. As shown there, the small bulk density is the most important fault.

TABLE 1*

| Name of product | Water | $MnO_2$ | MnO | Combined water | $SO_4$ | Activity | pH |
|---|---|---|---|---|---|---|---|
| Chem—$MnO_2$ Type A | 2.0 | 90.3 | 3.0 | 1.7 | 0.44 | 55 | 4.50 |
| Chem—$MnO_2$ Type C | 2.5 | 92.4 | 2.1 | 1.9 | 0.30 | 56 | 4.20 |
| Electrolytic $MnO_2$ | 1.3 | 92.6 | 1.7 | 4.4 | 1.06 | 55 | 4.80 |

*Tsugunori Honda*, Katsumi Mizumaki and Isao Tanabe: Manganese dioxide and dry cells, pp. 196–197, published by Nippon Kandenchi Kogyo-kai (December 1971).
*Inventors of Japanese Patent Publication No. 21,995/1975.

TABLE 2*

| Name of product | Grain size (mesh) | | | | Surface area ($m^2$/gr) (BET method) | Bulk density (gr/cc)** |
|---|---|---|---|---|---|---|
| | +100 | 100–200 | 200–325 | −325 | | |
| Chem—$MnO_2$ Type A | 0.0 | 1.7 | 31.4 | 66.9 | 86 | 0.90 |
| Chem—$MnO_2$ Type B | 0.0 | 2.3 | 31.4 | 66.3 | 72 | 1.01 |
| Electrolytic $MnO_2$ | 0.0 | 11.3 | 38.5 | 50.2 | 32 | 1.50 |

*Tsugunori Honda*, Katsumi Mizumaki and Isao Tanabe: Manganese dioxide and dry cells, pp. 196–197, published by Nippon Kandenchi Kogyo-kai (December 1971).
*Inventors of Japanese Patent Publication No. 21,995/1975.
**It was expressed in term of ml/100 g in the original paper, which is converted here to g/cc.

About such a fault of chemically synthesized manganese dioxide, the inventors of this invention considered that this fault was due to the manganese carbonate used as intermediate material, and they first studied the process for producing it. As a method for solving the problem, they studied the process starting from an aqueous solution of an ammonio complex of manganese.

The production of manganese carbonate from solutions of ammonio complexes of manganese as a starting material for manganese dioxide was studied by Welsh and mentioned in U.S. Pat. No. 3,011,867.

In connection to the decision of structural condition of his invention, Welsh mentioned in the specification of the patent the utilization of manganese carbonate formed by decomposing ammonio complex of manganese (manganese.ammonium.carbamate) at a temperature ranging from 65° C. to 68° C. and concluded that, at a decomposition temperature lower than 65° C., the product has faults in point of bulk density and granular characteristics though the manganese carbonate is readily oxidizable and that, at a decomposition temperature higher than 68° C., the resulting manganese carbonate is so poor in oxidation reactivity as to be impractical.

In the study of the second time, the present inventors first studied the relationship of the decomposition temperature of manganese.ammonium.carbamate solution and the composition, bulk density, tap density and state of grains of the resulting manganese carbonate.

Figure 1:
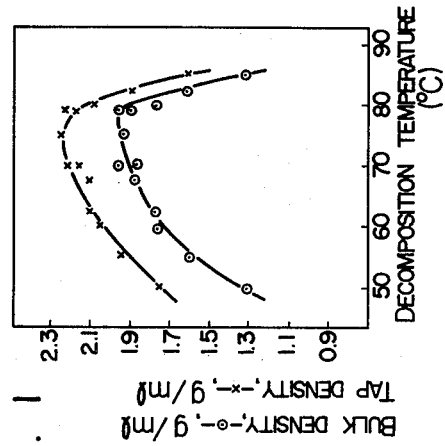

As one of the important points of the results, the relations between the decomposition temperature of solution and the bulk and tap densities of the resulting manganese carbonate were determined, as shown in FIG. 1. Thus it was revealed that the temperature range giving a manganese carbonate of the highest bulk density and tap density is 68° C. to 80° C.

FIG. 1 illustrates the decomposition temperature of manganese.ammonium.carbamate solution and the bulk density and tap density of manganese carbonate formed which are the fundamental factors of this invention.

Figure 4:
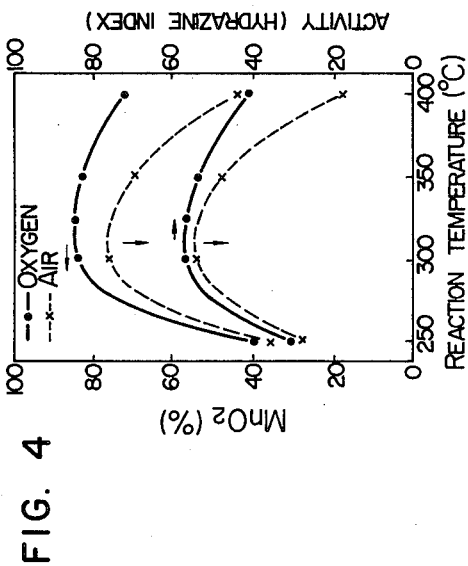
Figure 3:
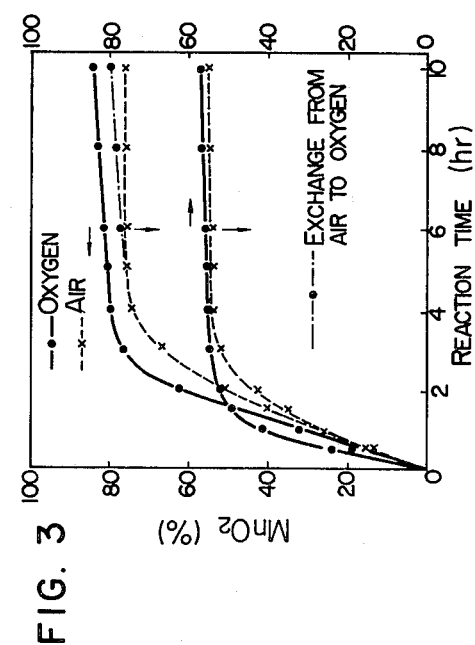
Figure 5:
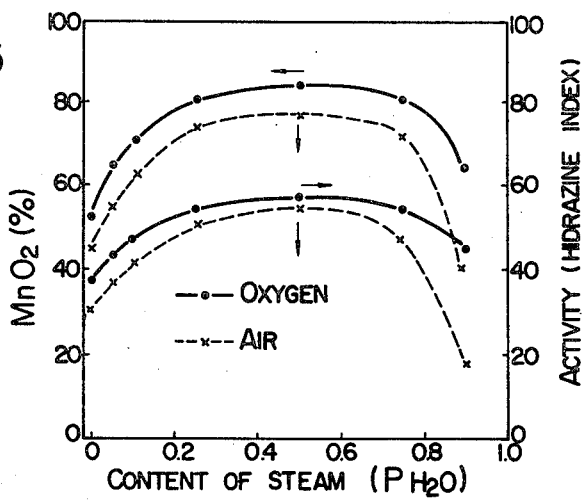
Figure 6:
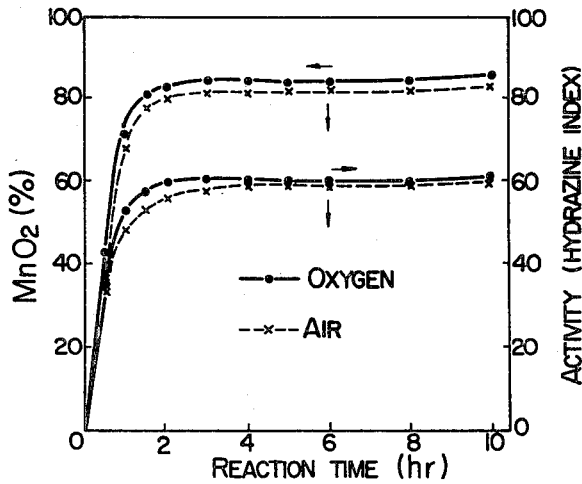
Figure 7:
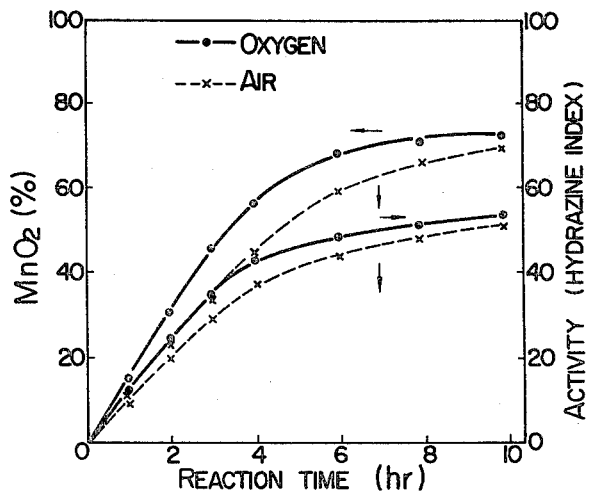

FIG. 2 illustrates the results obtained by subjecting the manganese carbonate produced according to this invention to oxidation reaction with dry oxygen and dry air. FIG. 3 illustrates the results obtained by reacting the manganese carbonate of this invention at 300° C. with steam-containing oxygen and air. FIG. 4 illustrates the results of a study on the reaction temperature in the same atmosphere as above. FIG. 5 illustrates the experimental results concerning steam concentration. FIG. 6 and FIG. 7 illustrate the experimental results obtained with a manganese carbonate which has been produced from manganese sulfate and sodium carbonate by the same process for producing the starting manganese carbonate as mentioned in Japanese Patent Publication No. 21,995/1975, which are presented for reference.

In Photo 1 to Photo 4, the state of the manganese carbonate produced according to this invention is compared with the state of the manganese carbonate produced by the same process as used in Japanese Patent Publication No. 21,995/1975 in order to illustrate the difference between them.

Based on this result, a chemical and physical study was conducted in the sense of comparing the manganese carbonate formed in such temperature range as to give a manganese carbonate of the highest apparent density with the manganese carbonate obtained from manganese sulfate and sodium carbonate used in the invention of Japanese Patent Publication No. 21,995/1975. The results are shown in Table 3. The results of a comparative study by means of a scanning electron microscope are shown in photographs 1 to 4.

The results are shown in FIGS. 2 to 7 and Photographs 1 to 4.

FIG. 2 illustrates the results obtained by reacting the manganese carbonate of this invention with dry air and dry oxygen. FIG. 3 illustrates the results of reaction at 300° C. using an oxygen having a controlled humidity of 1:1 and an air having a controlled humidity of 1:1. FIG. 4 illustrates the results of a reaction carried out in the temperature range of 250°–400° C. FIG. 5 illustrates the experimental results concerning the concentration of steam. FIG. 7 and FIG. 6 illustrate the results of reaction of manganese carbonate with dry oxygen and dry air and with an oxygen having a controlled humidity of 1:1 and an air having a controlled humidity of 1:1. In FIG. 3, there are also shown the experimental results obtained by using a steam-containing air in the early stage of reaction and a steam-containing oxygen in the later stage of reaction to complete the reaction.

As is apparent from FIGS. 2 and 3 illustrating the results of reaction with air, the manganese carbonate of this invention is more difficult to oxidize than that of manganese carbonate of Japanese Patent Publication No. 21,995/1975 shown in FIGS. 6 and 7.

TABLE 3

| Process | Reaction conditions | Mn (%) | $CO_2$ (%) | Combined water (%) | Bulk density (gr/cc) | Tap density (gr/cc) | Surface area (BET) ($m^2$/gr) | 50% mean grain diameter ($\mu$) |
|---|---|---|---|---|---|---|---|---|
| The same process as in Japanese Patent Publication No. 21,995/1975. | 80° C., molar ratio 1/1.05, $Na_2CO_3$ in excess. | 45.80 | 36.00 | 5.51 | 0.59 | 0.90 | 13.9 | 2.0 |
| The process of this invention. | 79° C., decomposition | 46.91 | 36.90 | 2.1 | 1.95 | 2.22 | 1.28 | 48.8 |
| The process of this invention. | 75° C., decomposition | 46.87 | 36.85 | 2.3 | 1.90 | 2.21 | 4.1 | 44.5 |

As is apparent from Table 3 and Photographs 1-4, the product produced from manganese sulfate and sodium carbonate and used in Japanese Patent Publication No. 21,955/1975 is obviously different from the product obtained by the high temperature decomposition of manganese ammonium carbamate solution according to the process of this invention. That is, the manganese carbonate produced by the same process as in the production of starting material in the old process is very fine in particle size, has a high content of combined water and has a great surface area, while that obtained by the process of this invention has a large particle size, is constructed of platy crystal pieces, and has a high content of manganese, a low content of combined water and a very small surface area.

Based on this fact, it is expected that the manganese carbonate of this invention will be greatly different from the former in reactivity. It is also considered that the impractically poor reactivity of the manganese carbonate formed at a decomposition temperature higher than 68° C., mentioned by Welsh, is attributable to this fact.

Here, it can be said that the manganese carbonate of this invention is a new type of intermediate material which has never been devised as a starting material of manganese dioxide.

Next, the thermal decomposition and oxidation process for the manganese carbonate of this invention was compared with that for the manganese carbonate obtained from manganese sulfate and sodium carbonate used in Japanese Patent Publication No. 21,995/1975.

That is, FIGS. 3-5 demonstrate that the oxidation is insufficient even with an air containing 1:1 of steam and the oxidation can be carried out sufficiently only with an oxygen containing 1:1 of steam. It is also demonstrated that a manganese dioxide for batteries having a high bulk density, a $MnO_2$ content of 80% or more and an activity of 55 or more (hydrazine index) can be obtained from the manganese carbonate having a bulk density of 1.9 or more produced with steam-containing oxygen according to this invention. Though the oxidative atmosphere of Japanese Patent Publication No. 21,995/1975 is an air containing 10–80% of steam, here is newly proposed in this invention a steam-containing oxygen for the decomposition and oxidation of manganese carbonate. There have hitherto been made no attempts at all to use a gas mixture of steam and oxygen, so that this design of reaction is utterly novel obviously.

In the case of manganese carbonate produced by the same process as in Japanese Patent Publication No. 21,995/1975 shown in FIG. 6, the results of reaction with steam-containing oxygen are comparable to the results obtained with steam-containing air. This means that the manganese carbonate produced from manganese sulfate and sodium carbonate needs no such new development as this invention. It is further obvious from this result and the results of FIGS. 3-5 obtained with air that the manganese carbonate of this invention and its oxidation are problems needing a development of a new process.

Thus the problem mentioned in U.S. Pat. No. 3,011,867 that manganese carbonate obtained by decomposing manganese.ammonium.carbamate.solution at a temperature of 68° C. or above is so poor in reactivity as impractical can be said to have been solved sufficiently by the process of this invention.

Based on the results of FIG. 4, the suitable temperature is decided as ranging from 275° C. to 375° C.

Next, FIG. 5 illustrates the results of a study concerning steam content, based on which the suitable content of steam in the oxygen gas can be decided as 15–85%.

The crude $MnO_2$ thus obtained having a $MnO_2$ content of 80% or more can directly be used as a manganese dioxide for battery to obtain good results. Also, it can be used as $MnO_2$ for battery in the form having an additionally improved quality which can be obtained either by treating it with sulfuric acid or adding thereto sulfuric acid and a small quantity of chlorate or adding thereto a small quantity of manganese carbonate, sulfuric acid and a small corresponding quantity of sodium chlorate.

Hereunder, a few examples of research works will be mentioned which include some cases of additional enriching treatment.

The oxygen used in this reaction is not limited to high purity oxygen having a purity of 99% or more, but oxygens produced by means of molecular sieve or the like having a quality of about 93% are also enough to exhibit the effects of this invention.

EXAMPLE 1

3.0 liters of a solution of manganese.ammonium.carbamate having a Mn concentration of 65.0 g/liter which had been obtained by reacting a manganese mono-oxide (MnO) produced by a reductive roasting of manganese dioxide ore with concentrated aqueous ammonia and gaseous carbon dioxide was dropped into a reactor having a capacity of 5.0 liters equipped with a stirrer over a time period of 12 hours, and reacted at a decomposition temperature of 79° C. The gas generated at this time was washed with water to recover the ammonia, while the carbon dioxide was discarded. After completing the dropping and decomposition, the resulting manganese carbonate was filtered and dried to obtain 417 gr of manganese carbonate containing 46.8% of Mn.

Its composition and properties were as shown in Table 4. It had a bulk density of 1.92 and a tap density of 2.20.

Subsequently, 400 gr of the manganese carbonate was shaped into a thin layer having a thickness of 10 mm in an open glass vessel, and inserted into a ring-formed electric furnace. While introducing an oxygen gas having a controlled steam content of 45% into the electric furnace, the reaction was carried out at a reaction temperature of 300° C. for 6 hours.

As the result, 308 gr of an oxidized product was obtained as shown in Table 4. Its chemical composition and properties are also shown in Table 4.

TABLE 4

| Name of product | Reaction conditions | Yield (%) | T-Mn (%) | $MnO_2$ (%) | Combined water (%) | Activity (hydrazine index) | Bulk density (gr/cc) | Tap density (gr/cc) |
|---|---|---|---|---|---|---|---|---|
| Manganese carbonate | Starting solution: 3 l of manganese. ammonium.carbamate (Mn content 65 gr/l); decomposed at 79° C. for 12 hrs. | 417 | 46.8 | 0.5 | 2.04 | — | 1.92 | 2.20 |
| Roasted oxide | 400 gr of manganese carbonate; atmosphere comprising 55% $O_2$ and 45% $H_2O$; 300° C., 6 hrs. | 308 | 60.7 | 83.8 | 1.92 | 57.5 | 1.56 | 1.71 |

That is, according to the process of this invention, a manganese carbonate having a sufficiently high bulk density and a roasted product having a high activity and a $MnO_2$ content of 83.8% were obtained in high yields.

EXAMPLE 2

In the same manner as in Example 1, 5 liters of a solution of manganese.ammonium.carbamate having a Mn concentration of 60.1 gr/liter obtained by reacting a MnO-containing previously treated mineral with ammonia and carbon dioxide was dropped into a constantly stirred 7 liter reactor kept at an appointed temperature of 75° C. over a time period of 15 hours, whereby the manganese.ammonium.carbamate was decomposed and manganese carbonate was formed. It was filtered and dried to obtain 645 gr of sand-formed manganese carbonate.

This manganese carbonate had the quality shown in Table 5. It was sufficiently heavy-weight, having a bulk density of 1.90.

Then 640 gr of this reaction product was shaped into a layer having a thickness of 10 mm in an open glass vessel and inserted into a large-sized ring-formed electric furnace. While introducing an oxygen gas having a steam concentration of 55%, it was heated and reacted at 305° C. for 6 hours to obtain 493 gr of a roasted oxide. Its composition and quality were as shown in Table 5. As shown there, it had a sufficiently high quality, a high activity and a high bulk density.

TABLE 5

| Name of product | Reaction conditions | Yield (gr) | T-Mn (%) | $MnO_2$ (%) | Combined water (%) | Activity (hydrazine index) | Bulk density (gr/cc) | Tap density (gr/cc) |
|---|---|---|---|---|---|---|---|---|
| Manganese carbonate | Starting solution: 5 l, Mn content 60 gr/l; decom- | 645 | 46.7 | 0.6 | 2.14 | — | 1.90 | 2.21 |

TABLE 5-continued

| Name of product | Reaction conditions | Yield (gr) | T-Mn (%) | MnO$_2$ (%) | Combined water (%) | Activity (hydrazine index) | Bulk density (gr/cc) | Tap density (gr/cc) |
|---|---|---|---|---|---|---|---|---|
| Roasted oxide | posed at 75° C. for 12 hrs. Manganese carbonate 640 gr; reactant gas; oxygen 45%, H$_2$O 55%; 305° C.; 6 hrs. | 493 | 60.5 | 83.5 | 1.92 | 57.7 | 1.57 | 1.69 |

Next, 100 gr of this roasted oxide was subjected to an enriching treatment either by treating it with sulfuric acid, or by treating it with sulfuric acid and chlorate, or by mixing it with a small amount of manganese carbonate and chlorate and treating the mixture with sulfuric acid. The results were as shown in Table 6. The values shown there are enough for use in battery in both MnO$_2$ quality, activity, bulk density and tap density.

TABLE 6

| Treatment | Conditions of treatment | Yield (gr) | T-Mn (%) | MnO$_2$ (%) | Combined water (%) | Activity (hydrazine index) | Bulk density (gr/cc) | Tap density (gr/cc) |
|---|---|---|---|---|---|---|---|---|
| 50% Sulfuric acid | Roasted 100 gr; 50% sulfuric acid 250 ml; 85° C., 2 hrs. | 88.5 | 61.0 | 93.1 | 1.90 | 65.1 | 1.37 | 1.72 |
| 7.5% Sulfuric acid, Sodium chlorate | Roasted product 100 gr; 7.5% sulfuric acid 300 ml; sodium chlorate 8.4 gr; 85° C., 2 hrs. | 100.4 | 60.7 | 92.1 | 1.89 | 64.8 | 1.58 | 1.85 |
| 12% Sulfuric acid, Manganese carbonate, Sodium chlorate | Roasted product 100 gr; 12% sulfuric acid 300 ml; sodium chlorate 168 gr; manganese carbonate 17.3 gr; 85° C., 2 hrs. | 113.1 | 60.9 | 92.4 | 1.94 | 64.5 | 1.65 | 2.05 |

What is claimed is:

1. A process for producing manganese dioxide characterized by heating and decomposing a solution of an ammonio complex of manganese (manganese.ammonium.carbamate) at a temperature of 68° to 80° C., and then roasting the resulting manganese carbonate in air containing 15–85% of steam and then in oxygen containing 15–85% of steam at a temperature of 275° to 375° C.

2. A process for producing manganese dioxide characterized by heating and decomposing a solution of an ammonio complex of manganese (manganese.ammonium.carbamate) at a temperature of 70° to 80° C. and then roasting the resulting manganese carbonate at a temperature of 275° to 375° C. in oxygen containing 15–85% of steam.

3. A process according to claim 2, wherein after the roasting, the resulting manganese dioxide is treated by heating it with a diluted sulfuric acid or a solution of sulfuric acid and chlorate or a solution of sulfuric acid and manganese carbonate and chlorate.

4. A process for producing manganese dioxide characterized by heating and decomposing a solution of an ammonio complex of manganese (manganese.ammonium.carbamate) at a temperature of 68° to 80° C. to produce manganese carbonate having a bulk density of 1.9 g/ml, and then roasting the resulting manganese carbonate at a temperature of 275° to 375° C. in oxygen containing 15–85% steam.

5. A process according to claim 4, wherein after the roasting, the resulting manganese dioxide is treated by heating it with a diluted sulfuric acid or a solution of sulfuric acid and chlorate or a solution of sulfuric acid and manganese carbonate and chlorate.

6. A process as set forth in claim 4, wherein the resulting manganese dioxide has a bulk density of 1.37 g/ml or more.

* * * * *